United States Patent
O'Dea

(10) Patent No.: US 8,744,919 B1
(45) Date of Patent: Jun. 3, 2014

(54) SYSTEMS AND METHODS FOR RETAIL NETWORKING

(76) Inventor: Kyle John O'Dea, Gunnison, CO (US)

( * ) Notice: Subject to any disclaimer, the term of this patent is extended or adjusted under 35 U.S.C. 154(b) by 87 days.

(21) Appl. No.: 12/844,331

(22) Filed: Jul. 27, 2010

Related U.S. Application Data

(60) Provisional application No. 61/228,684, filed on Jul. 27, 2009.

(51) Int. Cl.
| | |
|---|---|
| *G06Q 30/00* | (2012.01) |
| *G06Q 40/00* | (2012.01) |
| *G06Q 30/06* | (2012.01) |
| *G06Q 10/06* | (2012.01) |
| *G06Q 10/08* | (2012.01) |
| *G06Q 50/28* | (2012.01) |

(52) U.S. Cl.
CPC .......... *G06Q 30/0601* (2013.01); *G06Q 10/063* (2013.01); *G06Q 10/0833* (2013.01); *G06Q 50/28* (2013.01)
USPC ............ 705/26.1; 705/7.12; 705/39; 705/330

(58) Field of Classification Search
CPC .......... G06Q 30/0601; G06Q 10/0833; G06Q 10/063; G06Q 50/28
USPC .................................. 705/26.1, 330, 7.12, 39
See application file for complete search history.

(56) References Cited

U.S. PATENT DOCUMENTS

| | | | | |
|---|---|---|---|---|
| 7,246,084 | B1 * | 7/2007 | Javangula et al. ......... | 705/26.35 |
| 7,548,878 | B2 * | 6/2009 | O'Halloran et al. ............ | 705/28 |
| 2001/0056386 | A1 * | 12/2001 | O'Halloran et al. ............ | 705/28 |
| 2002/0055912 | A1 * | 5/2002 | Buck ............................... | 705/76 |
| 2002/0077937 | A1 * | 6/2002 | Lyons et al. .................... | 705/28 |
| 2003/0036981 | A1 * | 2/2003 | Vaughan et al. ................ | 705/28 |
| 2006/0074762 | A1 * | 4/2006 | Heising et al. .................. | 705/26 |
| 2007/0011172 | A1 * | 1/2007 | Ruul ............................... | 707/10 |
| 2007/0192212 | A1 * | 8/2007 | Javangula et al. .............. | 705/26 |
| 2007/0208816 | A1 * | 9/2007 | Baldwin et al. ............... | 709/206 |
| 2008/0065514 | A1 * | 3/2008 | Eaton .............................. | 705/27 |
| 2009/0138398 | A1 * | 5/2009 | Cole et al. ....................... | 705/42 |
| 2009/0187492 | A1 * | 7/2009 | Hammad et al. ............... | 705/26 |
| 2010/0169163 | A1 * | 7/2010 | Alvin .............................. | 705/10 |
| 2011/0161198 | A1 * | 6/2011 | Berlin et al. ............... | 705/26.41 |

\* cited by examiner

*Primary Examiner* — Amee A Shah

(74) *Attorney, Agent, or Firm* — Kilpatrick Townsend & Stockton LLP

(57) ABSTRACT

Computing systems, methods, and program products can support a closed retail network. A computing system can receive an inquiry from a first member entity of a retail network and identifying a product of interest. The system can use a datastore to determine if the product of interest is available for sale by a first member by determining if the product is available from a second member. If the product of interest is available for sale, the computing system can indicate that the product is available, receive data from the first member entity indicating that the product has been sold to a customer and including payment information, use the payment information to transfer funds from the customer, and initiate a distribution of the transferred funds to the first and second member entities. The system may consider distribution rules in determining if the product is available for sale by the first member.

14 Claims, 4 Drawing Sheets

SYSTEMS AND METHODS FOR RETAIL NETWORKING

PRIORITY CLAIM

This application claims priority to U.S. Provisional Patent Application No. 61/228,684, filed Jul. 27, 2009, which is incorporated by reference herein in its entirety.

BACKGROUND

Continuing advances in network and computer technologies have led to an explosion in online commerce. For example, consumers may purchase items of interest from online-based retail entities (e.g., Amazon.com), online counterparts for brick-and-mortar retail entities, and/or, in some cases, directly from manufacturers, wholesalers, or vendors of any sort by navigating to a web site or other online resource, selecting product(s), and providing payment and shipping information.

Although online commerce has led to substantial benefits and efficiencies for numerous parties, it has also had unintended adverse consequences, especially in the case of retail entities who traditionally played a role beyond a mere distribution point for goods. For instance, specialty shops were and are relied upon by customers and potential customers as a source for relatively in-depth knowledge of available products and trends, recommendations for purchasing, using and maintaining products of interest, and as a focal point for a community of customers and enthusiasts. Examples of specialty shops include, but are not limited to, retail entities focused on snowboarding, surfing, and mountain biking equipment and accessories. These shops are often, but not always, relatively smaller businesses with a single location or only a few locations.

Although customers and potential customers may wish to rely on the services and knowledge of a specialty shop, not all potential customers actually support the shop economically. As an example, a potential customer may view products at a brick and mortar specialty shop and rely on the services and recommendations of a knowledgeable specialist at the shop but then use the recommendations to purchase product(s) from an online retail entity offering the same product at a lower price. The brick and mortar shop puts in the work to facilitate the sale, but sees no direct benefit. The customer may return to the shop for accessories in some cases and generate revenue, but just as likely may never return or may return for assistance in configuring the product purchased elsewhere.

Against this backdrop, retail entities must contend with the traditional problems of retailing. For instance, a retail entity may be required to estimate demand and commit to purchase of inventory well in advance of when the inventory is to be sold. The retail entity may end up with too much of a first product and too little of a second product to meet local demand. At the same time, a different retail entity may have too much of the second product and too much of the first product. Although inventory management is an important aspect of retail businesses regardless of size, overstocking or understocking may significantly affect the fortunes of a small business such as a specialty shop. Such retail entities may be highly motivated to move their excess inventories by heavily discounting the product(s) for which they have too much inventory, which ultimately leads to reduced profits or increased losses for all.

Manufacturers and other vendors, especially those of specialty goods, have attempted to reduce the economic impact of online sales by attempting to limit or prohibit online sales and enforce pricing schedules. However, these efforts have not been fully successful. Additionally, customers, especially those of specialty goods, may not always choose the best product on their own. When the ill-chosen product leads to an unfavorable experience, the customers blame the manufacturer or other vendor. Finally, deep discounts at the retail level can pressure manufacturers/vendors to lower wholesale prices, ultimately reducing manufacturer profitability; in practice, manufacturers/vendors often push the loss to retailers.

SUMMARY

A retail network service provider can maintain a closed network preventing non-member retailers to use its services. Additionally, access to the network can be limited to devices within the walls/premises of the individual retailers. The retail network service provider can mediate/control and make accessible the inventory of competitor retail locations within a given industry. In some embodiments, this is carried out by a computer system (e.g., a server, a group of servers accessible via "cloud computing," etc.) controlled by the retail network service provider and accessible to members of the retail network.

In some embodiments, a method of facilitating a transaction comprises receiving data regarding a sale completed at a first retail location, where the sale includes an exchange of payment information or payment at the first location. The sale can concern an item stocked at a second location. All of the costs and profit in each transaction are paid at point of sale and only at point of sale—essentially eliminating any receivables. The first and second retail locations may be completely independent from one another and may otherwise be competitors, but the retail network service provider can facilitate cooperation between the retail locations.

The method can further comprise mediating and distributing the funds between the first retail location and second retail location, with mediating and distributing performed by the retail network service provider and not the locations themselves.

Some embodiments of the present subject matter include a system for providing a closed network for member retail entity entities to pool inventory and share sales opportunities. For example, a retail network service provider can provide a computer system accessible by member retail entities to provide data identifying inventory available for sale by other members of the retail network. The computer system can respond to inquiries for products of interest from member retail entities and facilitate the exchange of information and payment for closing the sale. Access to some or all of the information of the retail network can be restricted to members of the network.

For example, a salesperson at a first member retail entity may log on to a web site provided by the computer system to search for an item (or items) of interest. If the computer system determines that a different (second) member retail entity has identified the item(s) as available to the network, the computer system can provide the salesperson an option to sell the item(s) available from the second member retail entity. The salesperson can provide shipping information (e.g., the customer's address) and payment information to the system, which can notify the second member retail entity of the sale. In some embodiments, the notification includes a shipping label for the second member retail entity to print, or the shipping label may be automatically printed. The payment information (e.g., a credit card) can be used to draw payment from the customer and distribute the proceeds between the first member retail entity, the second member retail entity, and/or the retail network service provider.

This arrangement can provide benefits to the member retail entities, product manufacturers (or other vendors), and customers. For instance, the customer's experience is enhanced since he or she receives the benefits of an in-store experience coupled with the wide selection of inventory available in online shopping. Member retail entities benefit by having an outlet for distributing excess inventory, the ability to offer a wider inventory than may otherwise have been possible, and/ or by not having to deal with the inconvenience and uncertain availability of special orders.

Manufacturers and/or other vendors can benefit as well. For instance, knowledgeable retail entities can guide customers in making more appropriate product selections than the customers would have made otherwise, which can help avoid adverse product experiences. Additionally, with an outlet for excess inventory, retail entities will more readily adhere to pricing schedules.

In some embodiments, the retail network service provider may enforce limits on distribution. For instance data representing exclusivity in terms of product, brand, and/or geography can be used when identifying available inventory so that a member of the network will only be able to act as the point of sale for products they are authorized to sell on their showroom floor.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the subject matter.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment.

Figure 1:
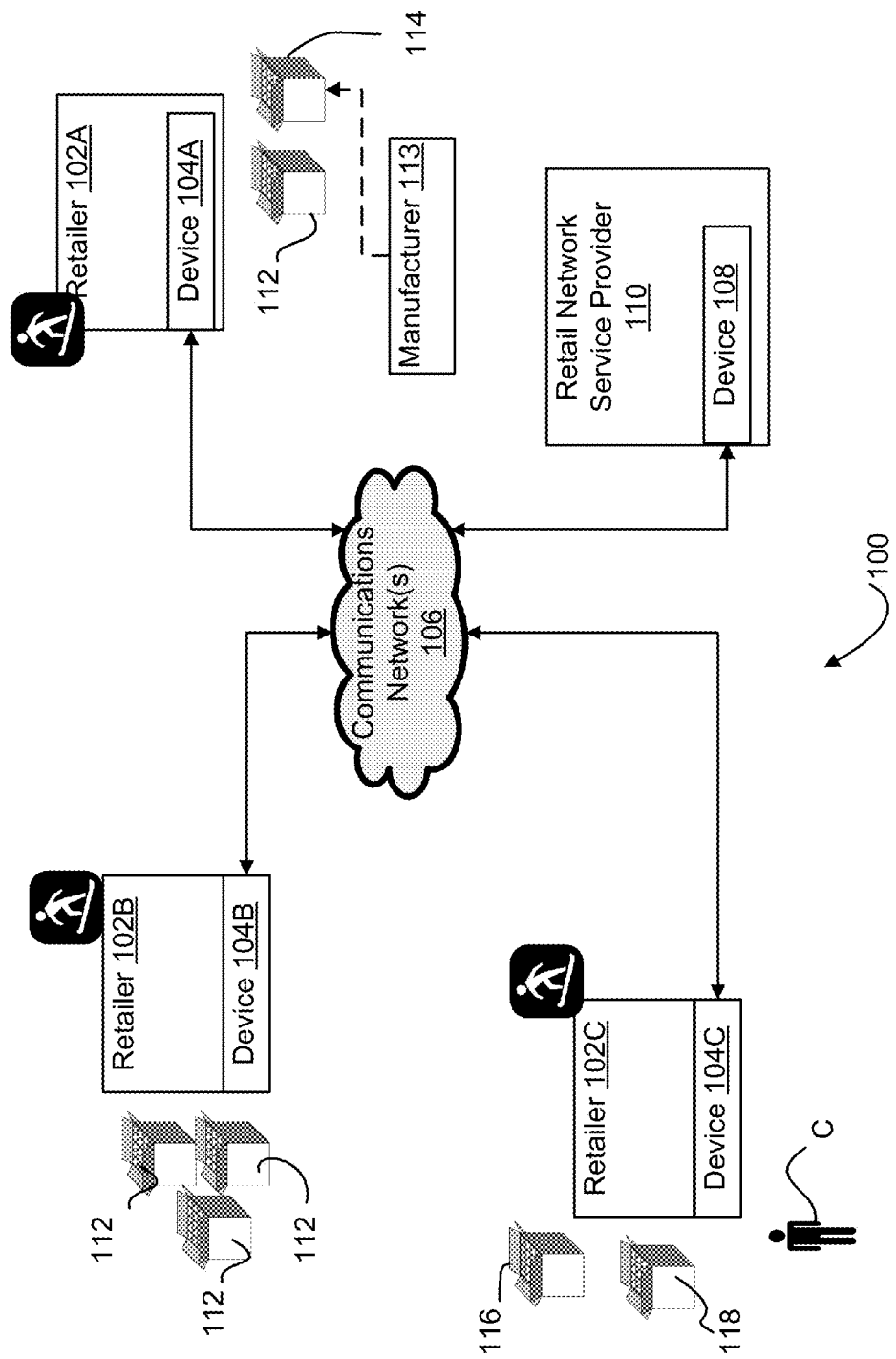
FIG. 1 is a block diagram illustrating an example retail environment.

FIG. 1 is a block diagram illustrating an example retail environment 100. In this example, a plurality of retail entities 102A, 102B, and 102C maintain various products in inventory to sell to customers such as customer C. The exemplary retail entities are depicted as snowboard shops, but may sell a variety of different products; additionally, the different retail entities may have a different mix of products. Although retail entities 102 may be of any size, in some embodiments, each retail entity 102A, 102B, and 102C corresponds to a unique company, individual doing business, or other organization. Thus, the retail entities are independent of one another and may in fact be competitors to one another. Each retail entity 102 may have a single location as illustrated or may have multiple locations in other embodiments.

In this example, each retail entity 102 includes a computing device 104 (labeled as 104A, 104B, and 104C) that facilitates connection to communications network 106. Communications network 106 may comprise the Internet or another suitable network. Communications network 106 facilitates connection to a computing device 108 configured to provide one or more retail network services in accordance with the present subject matter. For example, in some embodiments, computing device 108 can be maintained and controlled by a retail network service provider 110 that comprises an organization separate from the retail entities.

Retail network service provider 110 may facilitate participation of retail entities 102 in a closed retail network. For example, retail network service provider 110 may establish membership terms and procedures agreed to by retail entities 102. For example, as was noted above, each retail entity 102 may be a separate company, and each may have one or more brick-and-mortar specialty shops. In some embodiments, participation in a retail network is limited by size and/or expertise as evaluated by retail network service provider 110. As a specific example, participation in a retail network may be restricted to only independent shops specializing in a particular area of interest such as snowboarding, surfing, bicycling, and the like.

Computing device 108 can include access restriction mechanisms so that members of the retail network can access services, but inventory and other information is not generally accessible. For example, the retail entity computing devices 104 may authenticate themselves and/or users to computing device 108 before inventory information, ordering capability, and other retail network features are made available. Additionally, access to computing device 108 may be controlled to ensure that access to inventory data can only occur from within locations of retailers that are members of the retail network. Of course, the retail network service provider may make some information publicly available, such as a web site with information regarding how to join or contact the retail network.

Retail network service provider 110 may facilitate a plurality of different retail networks, although a single network is discussed in the examples below. For example, different retail networks may be established for different retail categories or niches. As another example, a manufacturer, wholesaler, or other vendor may act as a retail network service provider and allow some or all of its authorized dealers to become members of the retail network. The manufacturer, wholesaler, or other vendor could allow sale of only of the manufacturer (or vendor)'s products via the network and/or could allow other manufacturers" products to be sold via the network.

Each retail entity 102 is depicted as having inventory on hand. For example, retail entity 102A has inventory comprising product 112 and product 114. For purposes of illustration, a manufacturer 113 is illustrated as a provider of product 114. However, the various products held in inventory and distributed via the network may be obtained from one or more manufacturers, wholesalers, or other vendors or sources of any sort.

Retail entity 102B is depicted as having three units of product 112 in inventory. Retail entity 102C has one unit of product 116 and one unit of product 118. For example, products 112, 114, 116, and 118 may comprise different snowboard models, different snowboard brands, different snowboard sizes and/or may comprise entirely different products.

Customer C may visit retail entity 102C to select one or more products. For instance, customer C may specifically seek out product 112 or may determine, with the help of a salesperson at retail entity 102C, that product 112 is the best fit for customer C's needs. In this example, product 112 is a particular snowboard, although the present subject matter is applicable to any product.

The problem faced by customer C and retail entity 102C is that retail entity 102C does not have any units of product 112 in stock in this example. For instance, retail entity 102C may not ordinarily stock product 112 or may have sold out of product 112. As another example, retail entity 102C may seasonally stock snowboarding equipment for part of the year and then stock other products (e.g., surfing equipment) for another part of the year. Customer C may arrive after retail entity 102C has restocked with surfing equipment.

Retail entity 102C may recommend a different product to customer C, but the available product may not entirely fit customer C's needs. As another example, retail entity 102C may special order product 112 from the manufacturer (or other vendor). However, one or more problems may arise. For instance, product 112 may not be available at all, or may be available after only an unacceptably long delay. Another problem is that the special order process may inconvenience both retail entity 102C and customer C—the retail entity must take on the responsibility of placing the order and coordinating delivery/billing, while the customer must wait for the product and (typically) return to the retail entity once the product arrives.

On the other hand, retail entity 102B has several units of product 112 in stock. For example, retail entity 102B may have previously ordered more units of product 112 than were ultimately needed to meet actual demand at retail entity 102B. Customer C may seek out retail entity 102B independently, but neither customer C nor retail entity 102C may be aware of retail entity 102B's situation. For instance, retail entities 102B and 102C may be in different cities, states, or regions. Retail entities 102B and 102C may be competitors and may thus be disinclined to share inventory data and customers with one another.

Use of a retail network in accordance with one or aspects of the present subject matter can provide another option for fulfilling customer C's needs while benefiting retail entities 102B and 102C. For example, retail entities 102B and 102C may be members of a closed retail network facilitated by retail network service provider 110. For example, retail entities 102B and 102C (and/or other retail entities) may be parties to a membership agreement allowing access to the retail network to list available inventory and to sell inventory listed via the network.

Accordingly, the salesperson at retail entity 102C may log on to a website (or other interface) available from device 108 or otherwise access a resource provided by retail network service provider 110 to determine if product 112 is available from one or more other members of the network. The website may return a page indicating that one or more units of product 112 are available via the network; in this example, this is due to information previously provided by retail entity 102B indicating that retail entity 102B is willing to be a shipping store for one or more units of product 112. In some embodiments, the retail network service provider website (or other interface) allows a user to search for a particular product and simply returns an indication of whether the product is available from elsewhere in the network. Thus, a retail entity can feel secure that its competitors are not capable of browsing or inferring a listing of the retail entity's inventory.

In some embodiments, retail entity 102C may be informed that retail entity 102B makes product 112 available, while in other embodiments more general information (e.g., a location of retail entity 102B) or no information is provided other than availability. Additional information, such as pricing, expected shipping time, and the like can also be provided. In some embodiments, product data (e.g., technical specifications, brochures, etc.) can be provided by accessing the product data alongside inventory data to help aid the sales process.

The membership terms for the retail network may allow members to list some, but not all, inventory as available for shipping in response to orders from the retail network. For example, retail entity 102A may be a member of the retail network along with retail entities 102B and 102C. As seen in FIG. 1, retail entity 102A has one unit of product 112 in inventory. Retail entity 102A may wish to keep product 112 for local sale—for instance, retail entity 102A may judge demand sufficiently strong to "save" product 112 for on-the-spot sale at the location of retail entity 102A. On the other hand, retail entity 102A may choose to make product 114 available to the network.

The terms may also allow (or require) retail entities 102 to de-list a product if it is sold locally. For example, retail entity 102B may indicate to the network that three units of product 112 are available. If all three units are purchased locally at retail entity 102B, retail entity 102B can de-list the products or change the number of available units accordingly.

In some embodiments, the membership terms of the network require the retail entities to prioritize any orders received via the network or set aside products listed with the network from the products available for local sale. This may provide an incentive for a retail entity to first verify that any product listed for shipment via the retail network has not been sold by the network before the retail entity commits to selling the product locally. As another example, the retail entity may be required to remove product listings from the network before offering the product for sale locally. For instance, retailers may be subject to penalties if they indicate a product as available but then do not respond to an order to ship the product. The penalties may include fines and/or exclusion from the network.

In this example, product 112 is available from shipment from retail entity 102B, so retail entity 102B is designated the "shipping store." Retail entity 102C can confirm the sale and submit sales data to the retail entity network service provider 110. For example, retail entity 102C can provide customer data such as Customer C's name, shipping address, credit card or other payment information, and/or other parameters such as shipping preferences. Retail network service provider 110 can complete the transaction, such as by charging/debiting the customer's account and then provide an order to retail entity 102B to ship the product.

In some embodiments, the data provided to the shipping store (retail entity 102B in this example) includes data for generating a printable shipping label. For example, device 104B may be interfaced to a label printer. When an order is received via the retail network, the label printer can automatically print a shipping label which identifies the product to ship. Retail network service provider 110 can maintain an account with one or more shippers and interface with the shipper(s) to make payment (and in some embodiments arrange pick-up by the shipper) so that the shipping store simply has to place the label on product 112 in a suitable container and make product 112 available for pick up.

Retail network service provider 110 can also distribute the proceeds of the sale accordingly. For example, in some embodiments, retail network service provider 110 takes a commission and then splits the sale proceeds between the shipping store (retail entity 102B in this example) and the selling store (retail entity 102C in this example). The percentages and distribution terms can vary. For instance, retail entity 102B may not receive its share until shipment or delivery of the product is confirmed. For example, in one embodiment, the shipping store's share of the proceeds (i.e., retailer 102B's share in this example) is placed in an escrow account until pickup of the shipped product is confirmed by the shipper. This can be achieved, for example, by configuring computing device 108 to monitor tracking data from the shipper.

In some embodiments the retail network service provider takes distribution agreements into account. Returning to the example above, product 112 may be available only from certain outlets (or even a single outlet) pursuant to terms set by its manufacturer. Unless retail entity 102C is an authorized distributor, retail entity 102C may not be allowed to sell product 112. The retail network service provider can enforce such terms using a rule set that verifies whether a store can sell a product prior to indicating availability of the product via the network.

Figure 2:
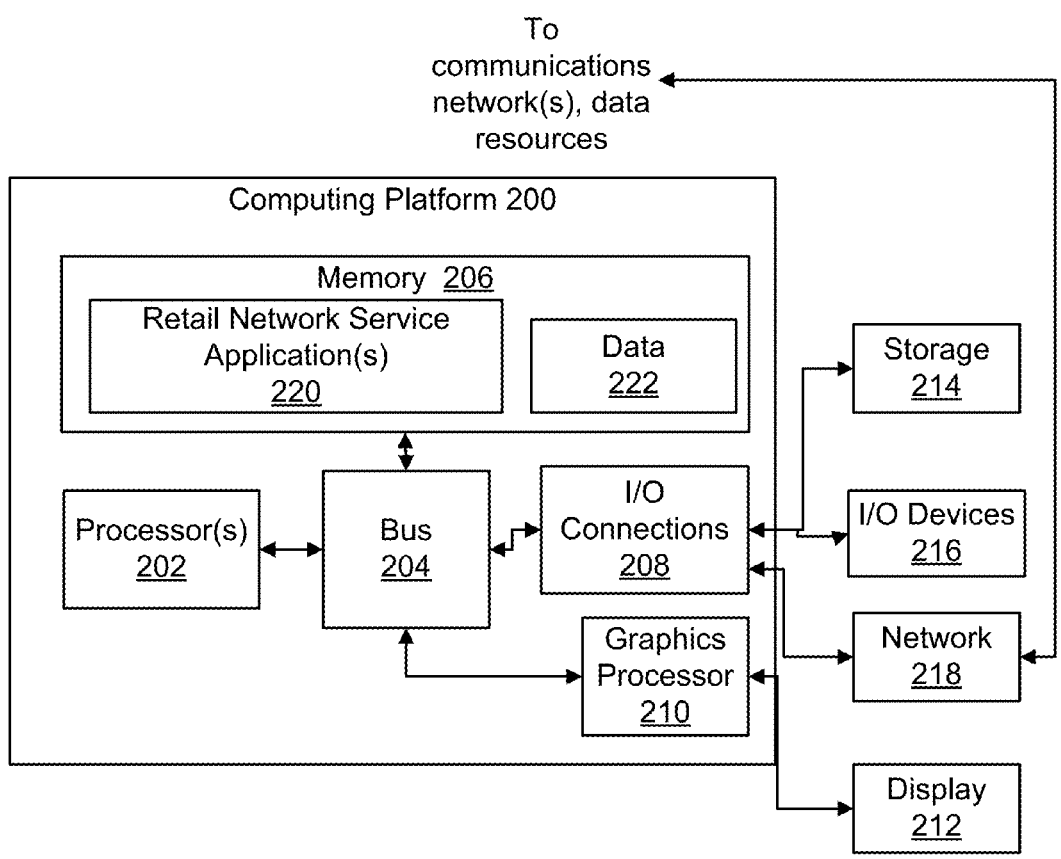
FIG. 2 is a diagram illustrating an example of a computing platform configured to provide data and other services in support of a retail network.

FIG. 2 is a diagram illustrating an example of a computing platform 200 configured to provide data and other services in support of a retail network. Computing platform 200 may represent one or more devices provided by or under the control of a retail network service provider. Platform 200, in this embodiment, comprises one or more processors 202, a bus 204, memory 206, input-output connections/bus 208, graphics processor 210, a display 212, user input (UI) devices 216 (e.g., a mouse, keyboard, etc.), storage element(s) 214 (e.g., local disks), and network connection component 218 (e.g., network card(s)). Memory 206 represents one or more computer-readable media accessible by processor(s) 202, and in this example embodies one or more retail network service applications 220 and data 222.

For example, retail network service applications 220 can comprise a suite of applications for managing member data, inventory data, interfacing with shipping, credit card, and other providers, and for administering the retail network and providing customer service functions. Data 222 may be accessed from local or remote sources and can comprise, for example, a listing of available inventory, member contact information, membership status, customer data, and other data used in the course of operating the retail network. Memory 206 may include further components or applications such as an operating system and the like.

From a hardware perspective, computing platform 200 may also be representative of one or more devices used by retail entities in the network such as retail entities 102, although member-side software can be utilized by members rather than retail network service applications 220.

In some embodiments, although the same hardware (e.g., the shop PC) may be used to interact with the retail network, the member retail entity's inventory and other data is maintained entirely separately from the retail network. Thus, member retail entities have no need to worry about integrating their respective systems or unknowingly sharing sensitive data with one another.

For example, member retail entities may simply use a browser to access a web site or other interface provided by network service providers and utilize suitable software to print labels, read customer credit/debit cards and facilitate sales via the retail network. For instance, in some embodiments, a bar code scanner or other input device can be used to input data (e.g., SKUs) identifying products to be listed via the retail network, with listing data uploaded via a web page or other interface. A retail entity can search the retail network for products of interest and select one or more available products to close a sale via a second web page or other interface.

As another example, rather than a browser, a custom client-side application may be available for use by retail entities to access retail service network resources. As a further example, a retail entity's point-of-sale (POS) system, inventory system, accounting system, or other system may interface with systems of the retail network service provider through one or more application programming interfaces (APIs). In such cases, adequate control and security can be included to avoid the possibility of retailers tunneling through the service provider to access sensitive data from one another.

Figure 3:
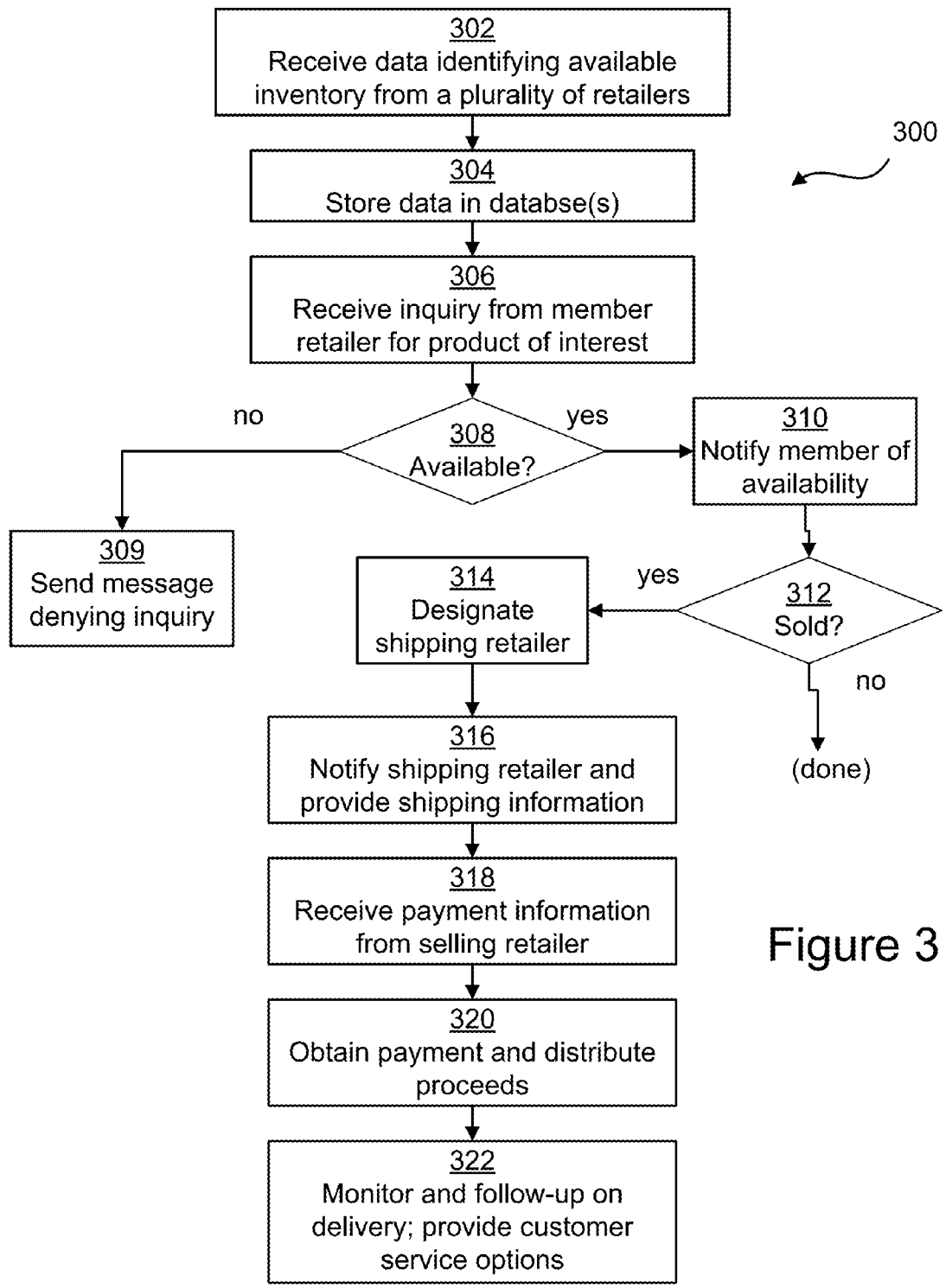
FIG. 3 is a flowchart showing an example method for facilitating sales via a retail network.

FIG. 3 is a flowchart showing an example method 300 for facilitating sales via a retail network. Block 302 represents receiving data identifying available inventory from a plurality of retail entities. As was noted above, as an example, each of a plurality of independent specialty shops or other retailers may scan, type, or otherwise input data identifying particular products for which the respective shop/retailer is willing to serve as a "shipping store" if the product is sold by another member of the network. At block 304, the data is stored in one or more databases. For example, a web application may take the received input and store it in a retrievable format.

Block 306 represents receiving an inquiry from a member retail entity for one or more products of interest. For example, a salesperson may browse a listing of available products and/or search for particular products by SKU or other identifier. Block 308 represents checking to see if the product is available for sale by the inquiring member retail entity (i.e., the potential selling store). This can include determining whether any other members (i.e., potential shipping stores) of the retail network have indicated that the product is available to the retail network. For example, a database of available inventory can be queried.

The determination of whether a product is available for sale can also consider whether a requesting entity is allowed to sell the product and thus the product may be indicated as "unavailable" even if another member has the product in inventory. As noted above, in some embodiments the retail service provider uses one or more rules to enforce limitations on product distribution, and the determination of availability can consider the rule(s). For example, the SKU or other identifier for the product(s) of interest may be checked against a listing of products to determine if the member retail entity is allowed to sell the product(s) of interest (or is prohibited from selling the product(s) of interest). As a particular example, a list of products authorized (or unauthorized) for sale by the member retail entity and/or a table of products along with indications of authorized (and/or unauthorized) retail entities may be consulted. As another example, the limitations may be geographic—the member retail entity's location may be checked against data listing authorized member entities for products according to different geographical regions or area. In any event, if the member retail entity is not allowed to sell the product, then the result may indicate that the product is not available via the retail network even if another store has the product in inventory.

Block 309 represent sending a message denying the inquiry if the product is not available. For instance, an error may be returned or a "not available" message may be provided. However, if one or more units of the product are available for the requesting member, then at block 310 the requesting member is notified of the availability.

Block 312 represents determining whether the product(s) of interest have been sold—i.e., has the inquiring member completed the sale? If not, then the process ends or is suspended until the sale is closed or abandoned. If the sale does go through, then block 314 represents designating at least one shipping retailer from which the product will be shipped. Additionally, the inquiring retailer can be designated as the "selling store," since the inquiring retailer made the sale. For example, the salesperson may click a "submit" or "sold" button committing the selling store to the sale, which triggers designation of the shipping store.

In some embodiments, a shipping store can be selected from one of a plurality of members of the network. For instance, in some embodiments, the retail network service provider computing system(s) determine the closest potential shipping store. As another example, the selling store could be given a list of shipping stores to select from. If multiple units of a product are sold, multiple shipping stores may be designated.

At block 316, the shipping retailer(s) are notified of the sale and are provided shipping information. For example, the data may be available via a messaging system provided by the retail network service provider and/or may be provided via email or another communications method. In some embodiments, the data includes a printable shipping label and other data to facilitate drop shipping by the shipping retailer.

At block 318, the retail network service provider receives and processes customer payment information from the selling retailer. For example, the salesperson may swipe a customer's credit or debit card via the store's POS system and include that data when submitting the sale request, with the appropriate payment processing service contacted by the network service provider at block 320 to transfer funds from the customer. The funds transfer may draw on a checking or other account, credit card account, online payment service account, etc. As another example, payment data may be transmitted after the sale is made.

Block 320 also represents distributing proceeds according to the terms of the retail network. For example, the retail network service provider may take a commission on each sale and split the remaining proceeds between the shipping and selling stores according to a schedule set forth as part of the terms of participation in the retail network. Additionally or alternatively, the retail network service provider may rely on transaction fees and/or membership fees for revenue. As an example, the retail network service provider computing system may initiate a distribution of at least a portion of the funds by providing a message to a bank or other financial entity to perform a wire transfer, credit a charge account, or otherwise provide funds to the shipping and selling stores.

As noted above, in some embodiments the proceeds are not distributed to the shipping store until shipment is confirmed. For example, after payment information has been received and the transaction is processed, the shipping store's share of the proceeds may be placed into an escrow account until shipment is confirmed. The retail network service provider may monitor tracking data associated with the shipment to confirm whether the product is actually shipped. As another example, if a third-party escrow provider is used to hold and disburse the money in escrow, the third-party escrow provider could be provided with information on how to confirm shipment and/or the tracking data directly.

Block 322 represents ongoing post-sale activity by the retail network service provider. For example, the retail network service provider may track shipment of the product to ensure that the shipping store actually ships the product and does so in a timely manner. Payment to the shipping and/or selling stores may be withheld until shipment of the product as noted above or other conditions could be imposed. For example, payment could be withheld until delivery of the product or confirmed receipt of the product by the customer. The retail network service provider may also provide customer support via telephone and/or online interaction with customers. For example, each sale handled via the retail network may have a unique identifier so that sales data and customer satisfaction can be tracked by the retail network service provider.

The example noted above was for purposes of example only. In practice, the retail network service provider may be handling multiple concurrent sessions, and a member entity may be acting as both a shipping store for one or more sales and a selling store for others.

Figure 4:
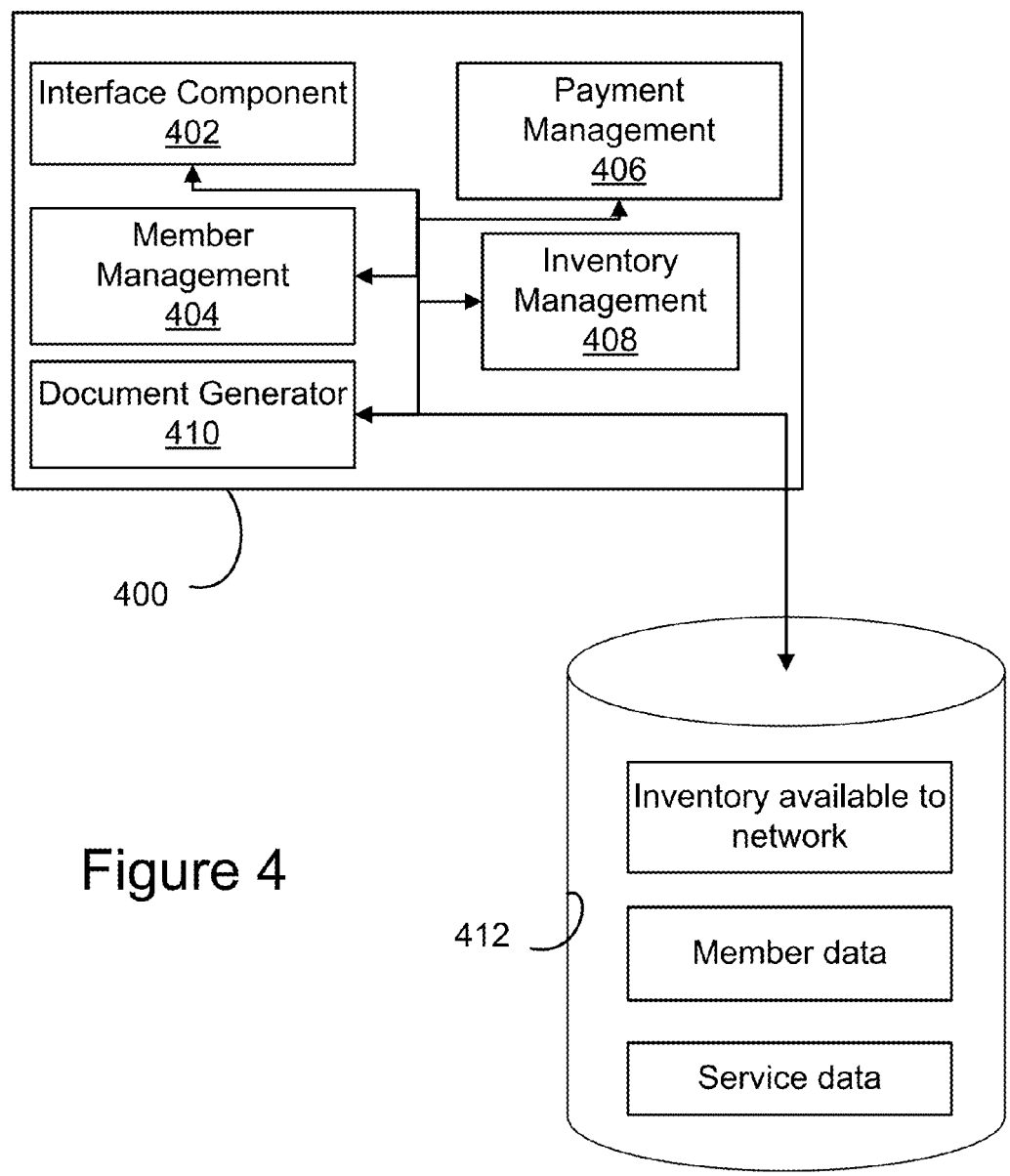
FIG. 4 is a diagram illustrating an example of software components that can be used to facilitate one or more retail networks.

FIG. 4 is a diagram illustrating an example of software components that can be used to facilitate one or more retail networks. For example, architecture 400 may represent functional modules or applications comprising retail network service application(s) 220 of FIG. 2. The modules may each comprise separate components or may be implemented via one or more applications. Data store 412 is representative of one or more databases or other storage systems used to maintain back-end data for the retail network service provider.

Block 402 represents an interface component, such as a web server, that can be used to respond to member inquiries and generate pages for viewing available inventory, submitting customer data, identifying inventory available to be sold via the retail network, administering accounts, and/or providing or receiving other data to/from the retail network service provider. Although a web-based front end can be used, some embodiments use a suitable application interface for one or more client applications customized for use with the retail network service provider.

As another example, the retail network service provider may use one or more applications having an application programming interface (API) that can be accessed via one or more existing applications used by a retailer, such as a point-of-sale or inventory system, for more seamless integration.

Logic included in interface component 402 or another component can be used to coordinate with other components to facilitate a sale. For example, once a command is received confirming a purchase, interface component 402 or the coordinating component can use other components to designate a shipping store, process payment, and ensure shipping arrangements are made.

Member management 404 can be used to manage member details, such as location information, payment/account information, authorized users, and other information regarding members of the retail network. Member management component 404 may additionally be used to coordinate sales and to track shipping and sales performance. For example, once a sale is indicated, member management component 404 can be provided a list of potential shipping stores that have the product in stock. Member management component may use one or more rules to match the selling store with a suitable shipping store if multiple potential shipping stores are available.

For example, member data identifying a store's mailing address may be accessed to identify the closest potential shipping store, while payment/account information can be accessed for use in distributing proceeds. As another example, multiple sales of a product held by multiple stores may be balanced across the retail network by suitable heuristics or rules for selecting shipping stores. Member management component 404 may also track tracked performance data such as shipping promptness, customer complaints, and overall sales performance.

Member management component 404 may also be used to maintain data regarding membership/participation agreements for a retail network and other rules used for handling orders and distributing proceeds. For example, component 404 may present a membership agreement to an interested retailer and provide an interface for receiving a commitment (e.g., a signed document, verified form, etc.) to abide by the terms of the agreement. Management component 404 may present an alert to an administrator to allow participation by the retailer or may automatically allow participation once the commitment has been received.

As noted above, in some embodiments the retail network will enforce limitations on distribution by only indicating availability of a product via the retail network if the requesting store is itself authorized to sell the product using a distribution ruleset. For example, member management component 404 may maintain, for each member, a list of products the member is authorized to sell (e.g., SKU numbers provided by a manufacturer or distributor). The list of products can be checked prior to indicating that the product is available to a requesting store. As another example, a list organized by product along with indications of which members are allowed (or not allowed) to sell the product can be used. Members may be identified individually (e.g., by name, member number) or more generally, such as by geographic area. As a further example, the list may be organized by brand or manufacturer to indicate whether particular members are authorized to sell any product for the brand/manufacturer. Additional factors can include date ranges during which particular members may sell (or may not sell) products.

Payment management component 406 can be used to access customer payment information submitted by selling shops and interface with appropriate service providers to obtain payments from customers and to initiate a distribution of the proceeds. For example, payment management component 406 may interface with credit card processors, online payment service providers, financial institutions, and/or check processors (e.g. ACH clearinghouse services) to obtain funds and then distribute funds according to member agreements. Data store 412 may include data identifying percentages to be allocated to the selling and shipping stores and retail network service provider, with the percentage data used to generate wire transfers or other payments of the appropriate share to the selling store, shipping store, retail network service provider, and/or other parties.

If funds are to be held in escrow prior to shipment by the shipping store (and/or other events), payment management component 406 can coordinate use of an appropriate account and/or third-party escrow provider. For example, payment management component 406 may prepare a transfer of a shipping store's share of the proceeds of a sale until tracking or other data indicates that the product associated with the sale has actually been shipped.

As another example, payment management component 406 may release the funds to an external escrow provider, with the external escrow provider instructed to hold the funds until the product has been shipped and/or other conditions have been met. Payment management component 406 may inform the external escrow provider if/when the condition is met; additionally or alternatively, when the funds are provided to the external escrow provider, sufficient information for the provider to confirm the condition(s) (e.g., tracking numbers) may be provided.

Inventory management component 408 can be used to maintain data in data store 412 representing products available for sale via the retail network. For example, when a member identifies products via a web or other interface, the SKU or other identifier(s) can be used to update the inventory data. Similarly, when a query is received, inventory management component 408 can access the data store to identify whether the item is available. As noted above, the availability determination can also, in some embodiments, take into account data indicating whether a requested product is allowed to be sold by the requesting store. Such information could be maintained with inventory information in addition to or instead of with member information.

When a sale is confirmed, the inventory data can be updated to reduce the units of the available products. Data identifying one or more members having the sold product in stock can be provided to component 404 to designate a shipping store. In some embodiments, the inventory data may also indicate pending, but not yet completed, sales so that a product that is about to be sold is not indicated as available.

In some embodiments, inventory management component 408 can be cross-referenced to manufacturer (or other vendor) data to provide information via interface component 402 (or another front-end interface). For example, a salesperson may search for a particular product name or SKU. Inventory management component 408 may retrieve a list of one or more products and use manufacturer (or other vendor) data to provide options including product descriptions, characteristics, and other technical details via the web interface. Inventory management component 408 may also support larger searches of available products, such as searches by product type, manufacturer/vendor, or other logical category inclusive of one or more particular products.

Document generator 410 can be used to generate shipping documents to enable drop-shipping from selling stores. For example, document generator 410 may interface with one or more suitable shipping companies using an account maintained by the retail network service provider to obtain a shipping authorization with a tracking number or other identifier. Customer data submitted to the retail network service provider can be used to include an address on the label, which can then be forwarded to the shipping store by email or other suitable communication method.

The above architecture was discussed for purposes of example only. In practice, numerous components can be used to provide the back-end services to facilitate sales and shared inventory across the retail network. Additional components can be used as well—for instance, a customer service module can be included to provide data to and receive feedback from customers and to facilitate telephone and online support.

Password and/or other security and authentication methods can be supported to maintain the integrity of the system. For example, an authorization routine may be carried out when a user logs into the retail network computing system to ensure that the login is from a member retailer and not from an entity outside the network (such as a non-participating shop or even a customer seeking a direct sale). In some embodiments, requests are verified to ensure they are from a device within the premises of a retailer (indoor or outdoor, depending on the circumstances of the retailer). Any suitable security technique(s) can be used to verify the identity and origin of logins and requests including, but not limited to, passwords, IP address verification, security tokens (hardware and/or software), etc.

Shipment management components can be used to obtain tracking and other information from shippers—for example, a shipment management component may be configured to communicate with a shipper computing system (e.g., via APIs of web services provided by the shipper) in order periodically check shipment status to confirm when a shipment has left a shipping store. The shipment status can be stored in data store 412, with the tracking update used to determine when (or whether) to release funds to the shipping store and/or for other purposes.

Although the retail network was discussed using examples of independent retailers, a large retail entity could be a member of a retail network as well. For example, a large chain store may be a member of a retail network but its participation may be limited to one or more specified department(s), product line(s), or product categories in the membership/participation agreement(s) for the retail network.

General Considerations

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

A computing device may access one or more non-transitory computer-readable media that embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable non-transitory computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising receiving, at a computing system comprising a processor and memory, data representing an inquiry from a first member entity of a retail network, the inquiry identifying a product of interest;

determining, by the computing system, if the product of interest is available for sale by the first member entity, wherein determining if the product is available for sale comprises determining if the product is available from a second member entity of the retail network by accessing a dataset indicating products made available by member entities of the retail network, wherein the first member entity and the second member entity are both separate, independent and competitor retail stores; and:

if the product of interest is available from the second member entity:

providing, by the computing system, data to the first member entity indicating that the product is available;

receiving, at the computing system, data from the first member entity indicating that the product has been sold to a customer and including payment information;

receiving, at the computing system, data for use in transferring funds from the customer;

receiving the transferred funds from the customer;

initiating, by the computing system, a distribution of at least a portion of the transferred funds to the first and second member entities; and accessing, by the computing system, tracking data associated with a shipment of the product of interest by the second member entity, wherein initiating the distribution of funds to the second member entity is based on determining a status of the shipment, wherein the computing system is configured to authenticate that a user is located in the first member entity and authorized to access data in the retail network associated with the first member entity before providing ordering information to the first member entity, and wherein the computing system is configured to restrict one member entity from viewing the complete inventory information of other member entities.

2. The method set forth in claim 1, wherein at least a portion of the transferred funds is not distributed to the first and second member entities and is retained as a commission for a retail network service provider.

3. The method set forth in claim 1, wherein initiating the distribution of funds to the second member entity is delayed at least until the status indicates that the second member entity has shipped the product of interest.

4. The method set forth in claim 3, wherein the initiating the distribution of funds is delayed by maintaining the transferred funds in an escrow account.

5. The method set forth in claim 1, further comprising:
providing, by the computing system, shipment information to the second member entity, the shipment information indicating a destination for the product of interest.

6. The method set forth in claim 1,
wherein determining, by the computing system, whether the product of interest is available for sale further comprises determining if the first member entity is authorized to sell the product of interest based on accessing data indicating a distribution rule for the product of interest,
wherein, if the first member entity is not authorized to sell the product of interest, the product of interest is determined to be not available for sale by the first member entity and the data indicating the product of interest is available is not provided to the first member entity.

7. A computing system comprising a processor and memory, the memory embodying one or more program components that configure the processor to:
receive data representing an inquiry from a first member entity of a retail network, the inquiry identifying a product of interest to a customer of the first member entity;
determine if the product of interest is available from a second member entity of the retail network, wherein the first member entity and the second member entity are both separate, independent and competitor retail stores; and:
if the product of interest is available from the second member entity:
provide data to the first member entity indicating that the product is available, receive data from the first member entity indicating that the product has been sold to the customer and including payment information, using the payment information, transfer funds from the customer, and initiate a distribution of at least a portion of the transferred funds to the first and second member entities, access tracking data associated with a shipment of the product of interest by the second member entity, wherein initiating the distribution of funds to the second member entity is based on determining a status of the shipment, wherein the computing system is configured to authenticate that a user is located in the first member entity and authorized to access data in the retail network associated with the first member entity before providing ordering information to the first member entity, and wherein the computing system is configured to restrict one member entity from viewing the complete inventory information of other member entities.

8. The computing system set forth in claim 1, wherein the one or more program components configure the processor to delay distribution of funds to the second member entity at least until the status indicates that the second member entity has shipped the product of interest.

9. The computing system set forth in claim 8, wherein the one or more program components configure the processor to delay distribution of funds by maintaining the funds in an escrow account.

10. The computing system set forth in claim 7, wherein determining if the product of interest is available from a second member entity of the retail network comprises searching a data store for a record related to the product of interest, the data store identifying one or more products identified by member entities of the retail network as available for sale via the retail network.

11. The computing system set forth in claim 7, wherein the one or more program components further configure the processor to:
provide shipment information to the second member entity, the shipment information indicating a destination for the product of interest.

12. The computing system set forth in claim 1, wherein the one or more program components further configure the processor to:
determine whether the first member entity is authorized to sell the product of interest based on accessing data indicating a distribution rule for the product of interest,
wherein, if the first member entity is not authorized to sell the product of interest, the data indicating that the product is available is not provided to the first member entity even if the product is available from the second member entity.

13. A computer program product comprising a non-transitory computer readable medium embodying program code executable by a computing system, the program code comprising:
program code for receiving, at a computing system comprising a processor and memory, data representing an inquiry from a first member entity of a retail network, the inquiry identifying a product of interest to a customer of the first member entity;
program code for determining, by the computing system, if the product of interest is available for sale by the first member entity, wherein determining if the product of interest is available for sale comprises determining if the product is available from a second member entity of the retail network, wherein the first member entity and the second member entity are both separate, independent and competitor retail stores;
program code for providing, by the computing system, data to the first member entity indicating that the product of interest is available if the product is determined to be available for sale;
program code for receiving, by the computing system, data from the first member entity indicating that the product has been sold to a customer and including payment information;
program code for receiving, by the computing system, data for use in transferring funds from the customer;
program code for receiving the transferred funds from the customer;

program code for initiating, by the computing system, a distribution of at least a portion of the transferred funds to the first and second member entities; and program code for accessing, by the computing system, tracking data associated with a shipment of the product of interest by the second member entity, wherein initiating the distribution of funds to the second member entity is based on determining a status of the shipment, program code for authenticating, by the computing system, that a user is located in the first member entity and authorized to access data in the retail network associated with the first member entity before providing ordering information to the first member entity, and program code for restricting, by the computing system, one member entity from viewing the complete inventory information of other member entities.

14. The computer program product set forth in claim 13, wherein the program code for determining if the product of interest is available for sale by the first member entity further comprises program code for determining if the first member entity is authorized to sell the product of interest, wherein the product of interest is determined not to be available for sale by the first member entity if the first member entity is not authorized to sell the product of interest.

* * * * *